United States Patent
Wang et al.

(10) Patent No.: US 10,990,853 B2
(45) Date of Patent: Apr. 27, 2021

(54) INFORMATION PROCESSING METHOD AND INFORMATION PROCESSING APPARATUS FOR IMPROVING THE DISCRIMINALITY OF FEATURES OF EXTRACTED SAMPLES

(71) Applicant: FUJITSU LIMITED, Kawasaki (JP)

(72) Inventors: Mengjiao Wang, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 16/191,090

(22) Filed: Nov. 14, 2018

(65) Prior Publication Data

US 2019/0156155 A1  May 23, 2019

(30) Foreign Application Priority Data

Nov. 20, 2017 (CN) .......................... 201711159683.5

(51) Int. Cl.
*G06K 9/62* (2006.01)

(52) U.S. Cl.
CPC ......... *G06K 9/6262* (2013.01); *G06K 9/6269* (2013.01); *G06K 9/6272* (2013.01); *G06K 9/6274* (2013.01)

(58) Field of Classification Search
CPC .. G06K 9/3241; G06K 9/6215; G06K 9/6218; G06K 9/6256; G06K 9/6267; G06K 9/6269; G06K 9/6274; G06K 9/00624; G06K 9/6807; G06K 2209/19; G06K 9/00006; G06K 9/4642; G06K 9/6223; G06K 9/00677; G06K 9/627; G06K 9/00268; G06K 9/00288; G06K 9/00369; G06K 9/4609; G06K 9/4628; G06K 9/6271; G06K 9/6288; G06K 9/6272; G06K 9/629; G06K 9/00422; G06N 20/00; G06N 3/0454; G06N 20/10; G06N 3/0472; G06T 2207/20081; G06T 7/248; G06T 7/70;

(Continued)

(56) References Cited

U.S. PATENT DOCUMENTS 5,638,465 A * 6/1997 Sano .................... G06K 9/6228
                                                          382/159
5,832,182 A * 11/1998 Zhang .................. G06K 9/6223
                                                          706/50

(Continued)

*Primary Examiner* — Guillermo M Rivera-Martinez
(74) *Attorney, Agent, or Firm* — Staas & Halsey LLP

(57) ABSTRACT

An information processing method and an information processing apparatus are disclosed, where the information processing method includes: inputting a plurality of samples to a classifier respectively, to extract a feature vector representing a feature of each sample; and updating parameters of the classifier by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

15 Claims, 3 Drawing Sheets

(58) Field of Classification Search
CPC .......... G06T 7/0016; G06T 7/20; G06T 7/60;
G06T 7/62; G06T 2207/30008; G06T
7/0012; G06F 16/2237; G06F 16/285;
G06F 16/906; G06F 17/16; G06F 16/583;
A61B 5/103; A61B 5/1075; A61B
5/7267; A61B 6/563; A61B 5/107; A61B
5/055; A61B 5/4514; A61B 5/4528;
H04B 17/309; H04B 17/391; H04W
24/02; G10L 25/18; G10L 25/93
USPC ................. 382/128, 156, 159, 224
See application file for complete search history.

(56) References Cited

U.S. PATENT DOCUMENTS

| | | | | |
|---|---|---|---|---|
| 2003/0050923 A1* | 3/2003 | Chang | ................ | G06F 16/9032 |
| 2005/0100209 A1* | 5/2005 | Lewis | ................ | G06K 9/6262 |
| | | | | 382/159 |
| 2006/0002600 A1* | 1/2006 | Martel-Pelletier | .... | G06T 7/0012 |
| | | | | 382/128 |
| 2006/0166619 A1* | 7/2006 | Roberts | ................ | H04L 27/02 |
| | | | | 455/39 |
| 2007/0038970 A1* | 2/2007 | DeMaris | ................ | G03F 1/44 |
| | | | | 716/51 |
| 2010/0142787 A1* | 6/2010 | Zheng | ................ | G06K 9/3241 |
| | | | | 382/131 |
| 2010/0280827 A1* | 11/2010 | Mukerjee | ............. | G10L 15/197 |
| | | | | 704/236 |
| 2011/0103657 A1* | 5/2011 | Kang | ................ | A61B 6/504 |
| | | | | 382/128 |
| 2011/0158535 A1* | 6/2011 | Iio | ................ | G06K 9/4642 |
| | | | | 382/190 |
| 2014/0126830 A1* | 5/2014 | Suganuma | ............. | G06K 9/622 |
| | | | | 382/225 |
| 2018/0114055 A1* | 4/2018 | Wang | ................ | G06K 9/00268 |
| 2018/0165554 A1* | 6/2018 | Zhang | ................ | G06K 9/6256 |
| 2020/0085382 A1* | 3/2020 | Taerum | ................ | G06N 3/084 |

* cited by examiner

INFORMATION PROCESSING METHOD AND INFORMATION PROCESSING APPARATUS FOR IMPROVING THE DISCRIMINALITY OF FEATURES OF EXTRACTED SAMPLES

CROSS-REFERENCE TO RELATED APPLICATIONS

This application claims the priority benefit of Chinese Patent Application No. 201711159683.5, filed on Nov. 20, 2017 in the China National Intellectual Property Administration, the disclosure of which is incorporated herein in its entirety by reference.

BACKGROUND

1. Field

The present disclosure relates to the field of information processing, and in particular to an information processing method and an information processing apparatus capable of improving the discriminability of features of extracted samples.

2. Description of the Related Art

In the process of training a convolutional neural network, designing of a loss function plays an important role. Different loss functions can bring about completely different performances to the convolutional neural network. In a convolutional neural network model with the aim of classification, the most conventional loss function is a softmax loss function. The use of the softmax loss function can give rise to separability among samples of different classes. As far as the classification problem is concerned, sample features shall not only be separable but also have discriminability. The latter requires a sample feature to have a smaller intra-class distance and a greater inter-class distance. The softmax loss function only ensures the separability among samples, but does not consider the discriminability of features. A novel loss function centerloss, which causes a sample feature to have a smaller intra-class distance by minimizing a distance from a feature vector of each sample to a center vector of a class, was recently proposed. However, according to the definition of the discriminability of samples, a sample feature shall not only have a smaller inter-class distance but also have a greater inter-class distance. In the centerloss loss function, nevertheless, the inter-class distance is not reflected.

SUMMARY

Additional aspects and/or advantages will be set forth in part in the description which follows and, in part, will be apparent from the description, or may be learned by practice of the embodiments.

A brief summary of the present disclosure is given below to provide a basic understanding of some aspects of the present disclosure. It should be understood that the summary is not exhaustive; it does not intend to define a key or important part of the present disclosure, nor does it intend to limit the scope of the present disclosure. The object of the summary is only to briefly present some concepts, which serves as a preamble of the detailed description that follows.

In view of the foregoing problem, an object of the present disclosure is to provide an information processing method and an information processing apparatus capable of solving one or more defects in the prior art.

According to an aspect of the present disclosure, there is provided an information processing method, comprising: inputting a plurality of samples to a classifier respectively, to extract a feature vector representing a feature of each sample; and updating parameters of the classifier by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

According to another aspect of the present disclosure, there is provided an information processing apparatus, comprising: a feature vector extracting unit configured to input a plurality of samples to a classifier respectively, to extract a feature vector representing a feature of each sample; and a parameter updating unit configured to, update parameters of the classifier by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

According to yet another aspect of the present disclosure, there is provided a computer-readable recording medium recording thereon instructions that, when executed, cause to: input a plurality of samples to a classifier respectively, to extract a feature vector representing a feature of each sample; and update parameters of the classifier by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

According to other aspects of the present disclosure, there is further provided a computer program code and a computer program product for implementing the foregoing method according to the present disclosure.

Other aspects of embodiments of the present disclosure will be given in the following specification part, wherein preferred embodiments for sufficiently disclosing embodiments of the present disclosure are described in detail, without applying limitations thereto.

BRIEF DESCRIPTION OF THE DRAWINGS

The present disclosure may be better understood with reference to the description given in conjunction with the drawings hereinafter. The same or similar components are denoted with the same or similar reference signs throughout the drawings. The drawings, together with the detailed description below, are incorporated in the specification and form a part of the specification, for further illustrating preferred embodiments of the present disclosure and explaining the principle and advantages of the present disclosure. In the drawings.

DETAILED DESCRIPTION

Figure 1:
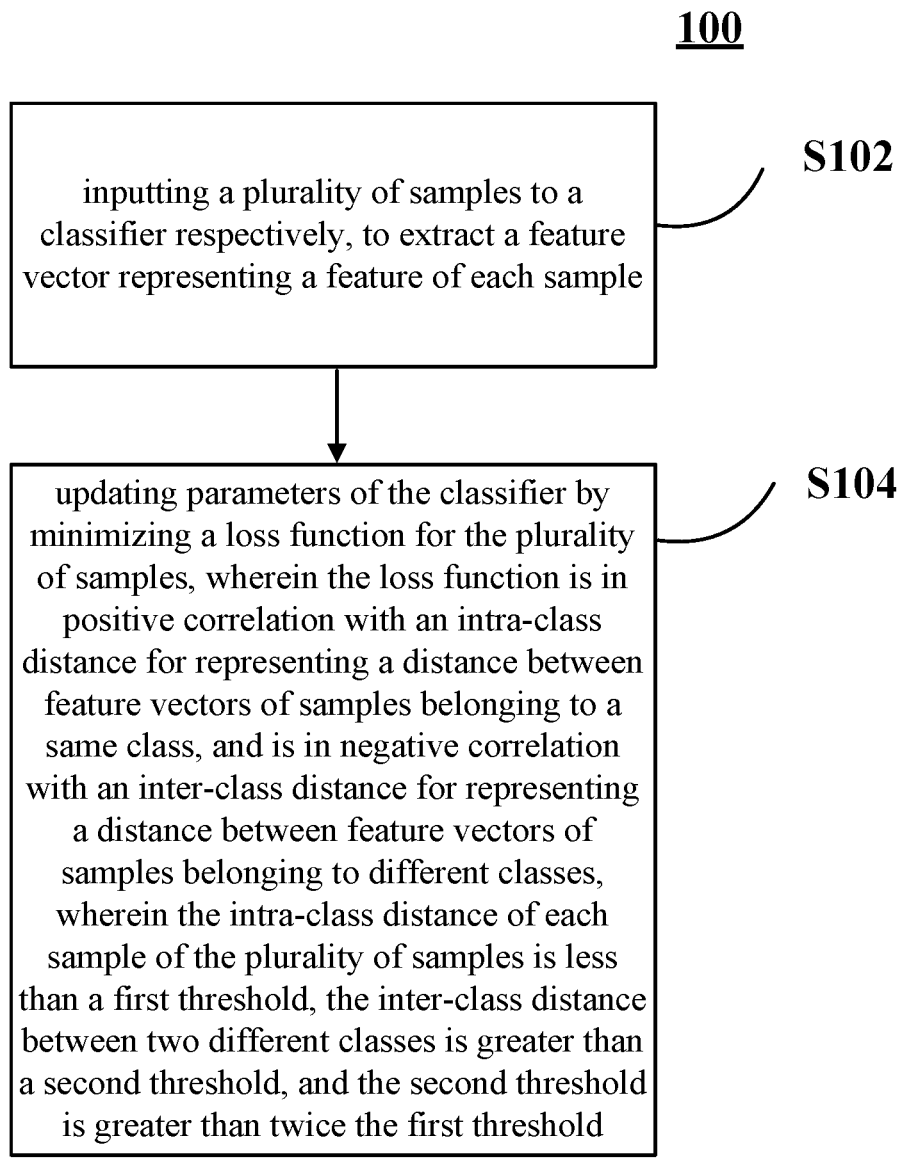
FIG. 1 is a flowchart showing a flow example of an information processing method according to an embodiment of the present disclosure.

Reference will now be made in detail to the embodiments, examples of which are illustrated in the accompanying drawings, wherein like reference numerals refer to the like elements throughout. The embodiments are described below by referring to the figures.

Hereinafter, exemplary embodiments of the present disclosure will be described in detail in conjunction with the appended drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should be appreciated that although developing tasks are possibly complicated and time-consuming, such developing tasks are only routine tasks for those skilled in the art benefiting from the contents of the present disclosure.

Although a few embodiments have been shown and described, it would be appreciated by those skilled in the art that changes may be made in these embodiments without departing from the principles and spirit thereof, the scope of which is defined in the claims and their equivalents.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure.

In a convolutional neural network classifier, a softmax loss function which is generally used is defined as follows:

$$L_S = -\sum_{i=1}^{m} \log \frac{e^{w_{y^i}^T x_i + b_{y^i}}}{\sum_{j=1}^{n} e^{w_j^T x_i + b_j}} \quad (1)$$

In the formula (1), $L_S$ is a result of the softmax loss function, W is a coefficient matrix, b is a bias vector, m is the number of total samples, $x_j$ (j=1, 2, ..., m) is a feature vector of a sample (for the convenience of description below, a feature vector $x_i$ of a sample is used to represent the sample), $y^j$ is a class label of the sample $x_i$, and n is the total number of classes.

The centerloss loss function in the prior art describes a distance from a feature vector of a sample to a center vector of a class. By minimizing this distance, an intra-class distance of the sample can be made smaller. The centerloss loss function may be represented by the following formula:

$$L_C = \frac{1}{2} \sum_{i=1}^{m} \|x_i - c_{y^i}\|_2^2 \quad (2)$$

In the formula (2), $L_C$ is a result of the centerloss loss function, m is the number of total samples, and $c_{y^i}$ is a center vector of a class $y^i$ to which a sample x belongs.

A gradient of the result $L_C$ of the centerloss loss function relative to $x_i$ is:

$$\frac{\partial L_C}{\partial x_i} = x_i - c_{y^i} \quad (3)$$

Updating of $c_{y^i}$ is as follows:

$$\Delta c_j = \frac{\sum_{i=1}^{m} \delta(y_i = j) \cdot (c_j - x_i)}{1 + \sum_{i=1}^{m} \delta(y_i = j)} \quad (4)$$

In the formula (4), δ(X) is a conditional function, wherein when X condition is satisfied δ(X)=1, and otherwise δ(X)=0.

The centerloss loss function in the prior art causes a sample feature to have a smaller intra-class distance by minimizing a distance from a feature vector of each sample to a center vector of a class. However, according to the definition of the discriminability of samples, a sample feature shall not only have a smaller inter-class distance but also have a greater inter-class distance. In the centerloss loss function, nevertheless, the inter-class distance is not reflected.

The present application proposes an improved loss function. The loss function considers an intra-class distance and an inter-class distance between feature vectors of samples, which cause a sample feature to have a smaller intra-class distance and to have a greater inter-class distance. Herein, we use two thresholds to quantitatively represent the intra-class distance and the inter-class distance: an intra-class edge distance and an intra-class edge distance. By making the intra-class distance of the sample feature smaller than the intra-class edge distance while making the inter-class distance thereof greater than the inter-class edge distance, an extracted feature satisfies the requirement of the discriminability. By this method, it is made possible to ensure the extracted sample features have small intra-class distances and great inter-class distances.

Embodiments of the present disclosure will be described in detail in conjunction with the appended drawings below.

First, a flow example of an information processing method 100 according to an embodiment of the present disclosure will be described with reference to FIG. 1. FIG. 1 is a flowchart showing a flow example of an information processing method according to an embodiment of the present disclosure. As shown in FIG. 1, the information processing method 100 according to the embodiment of the present disclosure comprises a feature vector extracting step S102 and a parameter updating step S104.

In the feature vector extracting step S102, a plurality of samples may be inputted to a classifier respectively, to extract a feature vector representing a feature of each sample.

The plurality of samples may be all the samples in a sample set. However, due to the problem of memory footprint, a compromise manner is to select a fixed number of samples per iterative training of a classifier, and the specific samples selected per iterative training of the classifier may be different.

The classifier may be a classifier capable of extracting a feature vector representing a feature of each sample which is known in the art.

In the parameter updating step S104, parameters of the classifier are updated by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

In the loss function in the information processing method 100 according to the embodiment of the present disclosure, both an intra-class distance for representing a distance between feature vectors of samples belonging to a same class and an inter-class distance for representing a distance between feature vectors of samples belonging to different classes are considered, such that the loss function is in positive correlation with the intra-class distance and is in negative correlation with the inter-class distance. Moreover, an intra-class edge distance $D_1$ (i.e., the first threshold as stated above) and an inter-class edge distance $D_2$ (i.e., the second threshold as stated above) are introduced to represent the intra-class distance and the inter-class distance, such that an intra-class distance of each sample of the plurality of samples is less than the intra-class edge distance $D_1$, and the inter-class distance between two different classes is greater than the inter-class edge distance $D_2$. To make the two classes separate, the inter-class edge distance $D_2$ is greater than twice the intra-class edge distance $D_1$.

Preferably, the classifier includes a convolutional neural network. The convolutional neural network is only exemplary but not limiting. The classifier may be a classifier capable of extracting a feature vector representing a feature of each sample which is known in the art.

Preferably, in the information processing method 100 according to the embodiment of the present disclosure, a distance between a feature vector of each sample and a center vector of a class to which the sample belongs is computed as the intra-class distance of the sample.

Below, it is assumed that m is the number of total samples, and that $x_i$ (i=1, 2, . . . , m) is a feature vector of a sample (for the convenience of description below, a feature vector $x_i$ of a sample is used to represent the sample).

A distance between a feature vector of each sample and a center vector of a class to which the sample belongs is taken or used as the intra-class distance of the sample (as stated above), the intra-class distance is used for representing a distance between feature vectors of samples belonging to a same class). The intra-class distance of the sample may be represented as $\|x_i - c_{y^i}\|$, where $c_{y^i}$ is a center vector of a class y to which a sample x; belongs.

An intra-class loss function $L'_C$ is defined as:

$$L'_C = 2\Sigma_{i=1}^m \max(\|x_i - c_{y^i}\| - D_1, 0) \quad (5)$$

In the formula (5), m is the number of total samples, and $D_1$ is an intra-class edge distance. By minimizing $L'_C$, it can be ensured that a distance between a feature vector of each sample and a center vector of a class to which the sample belongs is smaller than $D_1$.

Preferably, in the information processing method 100 according to the embodiment of the present disclosure, for the two different classes, a distance between a center vector of one class of the two different classes and a center vector of the other class is computed as the inter-class distance between the two different classes.

The inter-class distance for representing a distance between feature vectors of samples belonging to different classes may be represented by a distance between center vectors of the two classes. That is, the inter-class distance may be represented as $\|c_a - c_b\|$, where $c_a$ is a center vector of one class, and $c_b$ is a center vector of the other class.

The inter-class edge distance is defined as $D_2$. An inter-class loss function may be represented by the following formula:

$$L_D = 2\Sigma_{n=1}^n \Sigma_{b=a+1}^n \max(D_2 - \|c_a - c_b\|, 0) \quad (6)$$

In the formula (6), n is the total number of classes. As can be seen from the formula (6), by minimizing $L_D$, a distance between center vectors of every two classes is greater than the inter-class edge distance $D_2$. To make the two classes separate, the inter-class edge distance $D_2$ shall be at least twice of the intra-class edge distance $D_1$.

Preferably, the center vector of each class is an average of feature vectors of all samples belonging to the class. As an example, an average of feature vectors of all sampling belonging to each class is taken or used as a center vector of the class.

In this way, the loss function considering the intra-class distance and the inter-class distance may be represented as:

$$L = \lambda(L'_C + L_D) = \quad (7)$$
$$2\lambda\left(\sum_{i=1}^m \max(\|x_i - c_{y^i}\| - D_1, 0) + \sum_{a=1}^n \sum_{b=a+1}^n \max(D_2 - \|c_a - c_b\|, 0)\right)$$

In the formula (7), $\lambda$ is a coefficient, and can be determined according to experience. As can be seen from the formula (7), the loss function L is in positive correlation with the intra-class distance and is in negative correlation with the inter-class distance.

As can be seen from the formula (5), the gradient of C relative to x; is:

$$\frac{\partial L'_C}{\partial x_i} = \left(1 - \frac{1}{m_{y^i}}\right)(x_i - c_{y^i})\delta(\|x_i - c_{y^i}\| > D_1) \quad (8)$$

In the formula (8), $m_{y^i}$ is the number of samples of class y.

As can be seen from the formula (6), a gradient of $L_D$ relative to x; is:

$$\frac{\partial L_D}{\partial x_i} = -\sum_{a=1, a \neq y^i}^{n} \frac{1}{m_{y^i}} (c_a - c_{y^i}) \delta(\|c_a - c_{y^i}\| > D_2) \quad (9)$$

In the formula (9), $m_{y^i}$ is the number of samples of class $y^i$, and n is the number of total classes.

The updating of the center vector $c_{y^i}$ is the same as that in the existing centerloss loss function.

Preferably, a feature vector variance of each class is computed based on feature vectors of all samples in each class, an average of computed minimum feature vector variance and maximum feature vector variance is taken or used as the first threshold. As stated above, the first threshold is also referred to as the intra-class edge distance. As a specific example, if the computed minimum feature vector variance and maximum feature vector variance are $s_{min}$ and $s_{max}$, the intra-class edge distance $D_1$ may be represented as:

$$D_1 = (s_{min} + s_{max})/2 \quad (10)$$

The inter-class edge distance $D_2$ can be obtained according to $D_1$. Since $D_2$ shall be much greater than $2D_1$, the following relationship between $D_2$ and $D_1$ shall be satisfied:

$$D_2 \geq 2D_1 * 10 \quad (11)$$

Preferably, at the time of iteratively training the classifier, the parameters of the classifier are updated according to the loss function to update feature vectors of the samples, and per predetermined number of iteration, the first threshold and the second threshold are updated. As a specific example, at the time of iteratively training the classifier, the parameters of the classifier shall be updated according to the loss function to update feature vectors of the samples. In addition, the computation for the intra-class edge distance $D_1$ and the inter-class edge distance $D_2$ shall be updated once after a given number of iteration. For example, assuming that a largest number of iteration is $N_{iter}$, the parameters $D_1$ and $D_2$ shall be updated once after at least $N_{iter}/10$ number of iteration, so as to ensure each of the inter-class distance and the intra-class distance to converge to a reasonable value.

Preferably, besides the intra-class distance and the inter-class distance, the loss function may further include a softmax loss function. As a specific example, while considering the softmax loss function, the whole loss function may be expressed by the following formula:

$$L = L_S + \lambda(L'_C + L_D) = \quad (12)$$
$$-\sum_{i=1}^{m} \log \frac{e^{w_{y^i}^T x_i + b_{y^i}}}{\sum_{j=1}^{n} e^{w_j^T x_i + b_j}} + 2\lambda \left( \sum_{i=1}^{m} \max(\|x_i - c_{y^i}\| - D_1, 0) + \sum_{a=1}^{n} \sum_{b=a+1}^{n} \max(D_2 - \|c_a - c_b\|, 0) \right)$$

It is assumed that the inputs of the classifier are: training data $\{x_i\}$; initialized classifier parameter $\theta$; loss function parameters w and $\{\varepsilon_j | \varepsilon = 1, 2, \ldots n\}$; c learning rate a and parameter updating rate $\mu$; $\lambda$; iteration condition $\varepsilon$; iteration number t=0. The output of the classifier is classifier parameter $\theta$ having been trained. Based on the formula (12), the following equation simply describes the whole training process of the classifier.

When $|L^t - L^{t-1}| \geq \varepsilon$ $t := t+1$ $L^{t-1} := L^t$ $L^t := L_S^t + \lambda(L'^t_C - L^t_D)$ For each i:

$$\frac{\partial L^t}{\partial x_i^t} \approx \frac{\partial L_S^t}{\partial x_i^t} + \lambda \left( \frac{\partial L'^t_C}{\partial x_i^t} - \frac{\partial L^t_D}{\partial x_i^t} \right)$$

For each j:

$$c_j^{t+1} \approx c_j^t - \alpha \Delta c_j^t$$

$$W^{t+1} \approx W^t - \mu \frac{\partial L^t}{\partial W^t} = W^t - \mu \frac{\partial L_S^t}{\partial W^t}$$

$$\theta_C^{t+1} \approx \theta_C^t - \mu \sum_{i=1}^{m} \frac{\partial L^t}{\partial x_i^t} \cdot \frac{\partial x_i^t}{\partial \theta_C^t}$$

As can be seen, it is easier for the training method to be actually applied.

To sum up, in the information processing method 100 according to the embodiment of the present disclosure, both an intra-class distance and an inter-class distance between feature vectors of samples are considered, such that a sample feature has a smaller intra-class distance and has a greater inter-class distance, and two thresholds, i.e., an intra-class edge distance and an inter-class edge distance, are used to quantitatively measure the intra-class distance and the inter-class distance, such that the intra-class distance of the sample feature is smaller than the intra-class edge distance and meanwhile the inter-class distance of the sample feature is greater than the inter-class edge distance, thereby improving the discriminability of features of samples. In addition, it is easier for the information processing method 100 to be actually applied.

Corresponding to the foregoing embodiment of the information processing method, the present disclosure further provides the following embodiment of an information processing apparatus.

Figure 2:
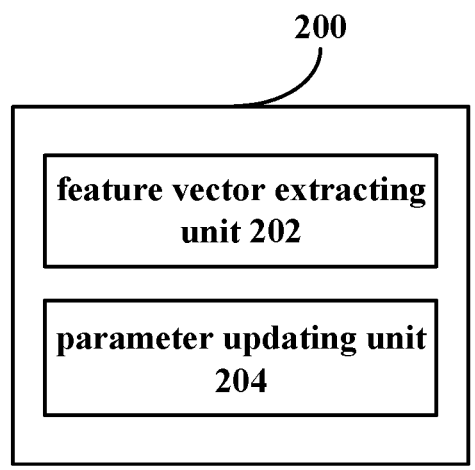
FIG. 2 is a block diagram showing a functional configuration example of an information processing apparatus according to an embodiment of the present disclosure.

FIG. 2 is a block diagram showing a functional configuration example of an information processing apparatus 200 according to an embodiment of the present disclosure.

As shown in FIG. 2, the information processing apparatus 200 according to the embodiment of the present disclosure may comprise a feature vector extracting unit 202 and a parameter updating unit 204. Next, functional configuration examples of the feature vector extracting unit 202 and the parameter updating unit 204 will be described.

In the feature vector extracting unit 202, a plurality of samples may be inputted to a classifier respectively, to extract a feature vector representing a feature of each sample.

The plurality of samples may be all the samples in a sample set. However, due to the problem of memory footprint, a compromise manner is to select a fixed number of samples per iterative training of a classifier, and the specific samples selected per iterative training of the classifier may be different.

The classifier may be a classifier capable of extracting a feature vector representing a feature of each sample which is known in the art.

In the parameter updating unit 204, parameters of the classifier are updated by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

In the loss function in the information processing apparatus 200 according to the embodiment of the present disclosure, both an intra-class distance for representing a distance between feature vectors of samples belonging to a same class and an inter-class distance for representing a distance between feature vectors of samples belonging to different classes are considered, such that the loss function is in positive correlation with the intra-class distance and is in negative correlation with the inter-class distance. Moreover, an intra-class edge distance (i.e., the first threshold as stated above) and an inter-class edge distance (i.e., the second threshold as stated above) are introduced to represent the intra-class distance and the inter-class distance, such that an intra-class distance of each sample of the plurality of samples is less than the intra-class edge distance, and the inter-class distance between two different classes is greater than the inter-class edge distance. To make the two classes separate, the inter-class edge distance is greater than twice the intra-class edge distance.

Preferably, the classifier includes a convolutional neural network. The convolutional neural network is only exemplary but not limiting. The classifier may be a classifier capable of extracting a feature vector representing a feature of each sample which is known in the art.

Preferably, in the parameter updating unit 204, a distance between a feature vector of each sample and a center vector of a class to which the sample belongs is computed as the intra-class distance of the sample.

A distance between a feature vector of each sample and a center vector of a class to which the sample belongs is taken or used as the intra-class distance of the sample. For the examples of the intra-class distance and the intra-class loss function, reference may be made to the corresponding description in the foregoing method embodiment, and repeated description will not be made herein.

Preferably, in the parameter updating unit 204, for the two different classes, a distance between a center vector of one class of the two different classes and a center vector of the other class is computed as the inter-class distance between the two different classes.

The inter-class distance for representing a distance between feature vectors of samples belonging to different classes may be represented by a distance between center vectors of the two classes. For the examples of the inter-class distance and the inter-class loss function, reference may be made to the corresponding description in the foregoing method embodiment, and repeated description will not be made herein.

Preferably, the center vector of each class is an average of feature vectors of all samples belonging to the class. As an example, an average of feature vectors of all sampling belonging to each class is taken or used as a center vector of the class.

Preferably, a feature vector variance of each class is computed based on feature vectors of all samples in each class, an average of computed minimum feature vector variance and maximum feature vector variance is taken or used as the first threshold. For the examples of the first threshold (intra-class edge distance) and the second threshold (inter-class edge distance), reference may be made to the corresponding description in the foregoing method embodiment, and repeated description will not be made herein.

Preferably, at the time of iteratively training the classifier, the parameters of the classifier are updated according to the loss function to update feature vectors of the samples, and per predetermined number of iteration, the first threshold and the second threshold are updated. As a specific example, at the time of iteratively training the classifier, the parameters of the classifier shall be updated according to the loss function to update feature vectors of the samples. For the examples of updating the first threshold (intra-class edge distance) and the second threshold (inter-class edge distance), reference may be made to the corresponding description in the foregoing method embodiment, and repeated description will not be made herein.

Preferably, besides the intra-class distance and the inter-class distance, the loss function may further include a softmax loss function. For the example of the loss function including softmax, reference may be made to the corresponding description in the foregoing method embodiment, and repeated description will not be made herein.

In addition, for the whole training process of the classifier, reference may be made to the corresponding description in the foregoing method embodiment, and repeated description will not be made herein.

To sum up, in the information processing apparatus 200 according to the embodiment of the present disclosure, both an intra-class distance and an inter-class distance between feature vectors of samples are considered, such that a sample feature has a smaller intra-class distance and has a greater inter-class distance, and two thresholds, i.e., an intra-class edge distance and an inter-class edge distance, are used to quantitatively represent the intra-class distance and the inter-class distance, such that the intra-class distance of the sample feature is smaller than the intra-class edge distance and meanwhile the inter-class distance of the sample feature is greater than the inter-class edge distance, thereby improving the discriminability of features of samples. In addition, it is easier for the information processing apparatus 200 to be actually applied.

It should be noted that, although the functional configuration of the information processing apparatus according to the embodiment of the present disclosure has been described above, this is only exemplary but not limiting, and those skilled in the art may carry out modifications on the above embodiment, for example may carry out additions, deletions or combinations the like on the functional modules in each embodiment, according to the principle of the present disclosure. Moreover, all of such modifications fall within the scope of the present disclosure.

In addition, it should also be noted that, the apparatus embodiment herein corresponds to the above method embodiment. Thus, for contents not described in detail in the apparatus embodiment, reference may be made to the corresponding description in the method embodiment, and repeated description will not be made herein.

In addition, the present application further provides a non-transitory computer-readable recording medium recording thereon instructions that, when executed, cause to: input a plurality of samples to a classifier respectively, to extract a feature vector representing a feature of each sample; and for the plurality of samples, update parameters of the classifier by minimizing a loss function, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

It should be understood that, the machine executable instructions in the storage medium and the program product according to the embodiments of the present disclosure may be further configured to implement the above information processing method. Thus, for contents not described in detail herein, reference may be made to the foregoing corresponding description, and repeated description will not be made herein.

Accordingly, a storage medium for carrying the above program product comprising machine executable instructions is also included in the disclosure. The storage medium includes but is not limited to a floppy disc, an optical disc, a magnetic optical disc, a memory card, a memory stick and the like.

According to another aspect of the present disclosure, there is further provided a method and an apparatus for classifying inputs with a classifier trained according to the above information processing method.

Figure 3:
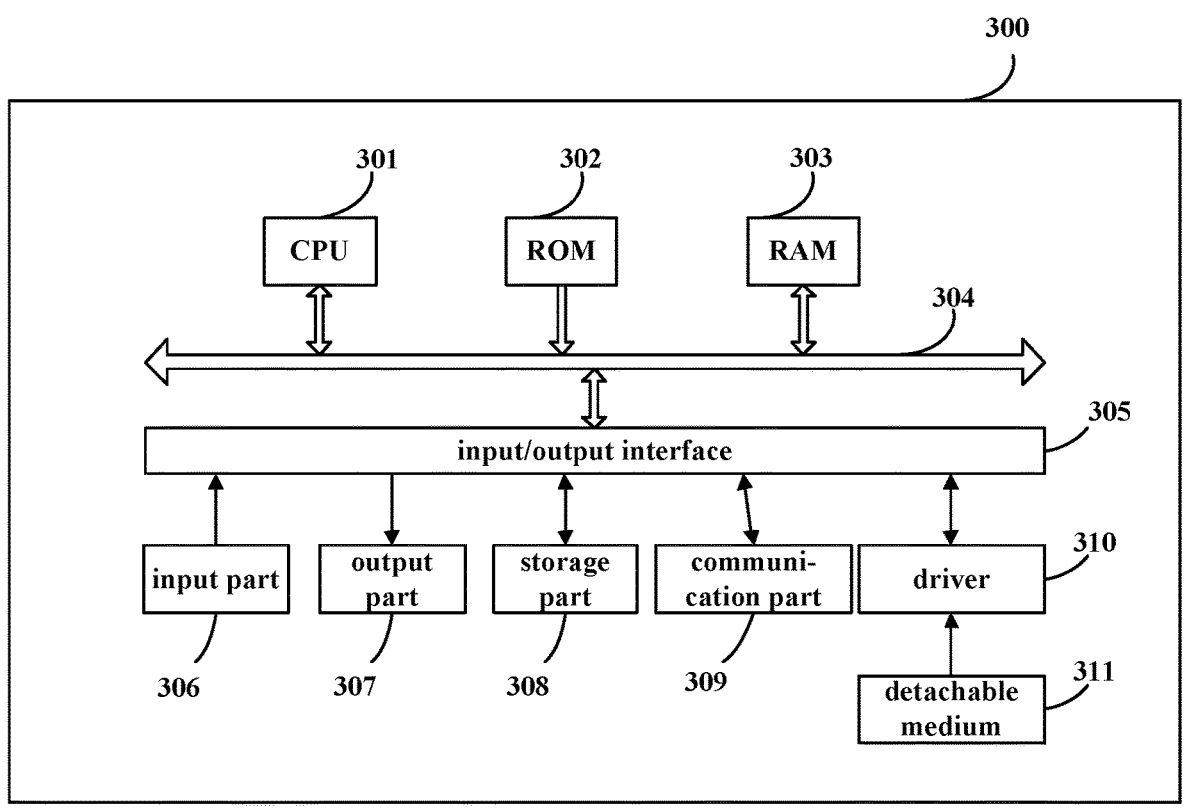
FIG. 3 is a block diagram showing an exemplary structure of a personal computer used as an information processing apparatus usable in the embodiments of the present disclosure.

In addition, it should also be noted that, the above series of processing and apparatuses may also be implemented by software and/or firmware. In the case of implementation by software and/or firmware, programs constituting the software are installed from a storage medium or a network to a computer having a dedicated hardware structure, for example the universal personal computer 300 as shown in FIG. 3. The computer, when installed with various programs, can execute various functions and the like.

In FIG. 3, a Central Processing Unit (CPU) 301 executes various processing according to programs stored in a Read-Only Memory (ROM) 302 or programs loaded from a storage part 308 to a Random Access Memory (RAM) 303. In the RAM 303, data needed when the CPU 301 executes various processing and the like is also stored according to requirements.

The CPU 301, the ROM 302 and the RAM 303 are connected to each other via a bus 304. An input/output interface 305 is also connected to the bus 304.

The following components are connected to the input/output interface 305: an input part 306, including a keyboard, a mouse and the like; an output part 307, including a display, such as a Cathode Ray Tube (CRT), a Liquid Crystal Display (LCD) and the like, as well as a speaker and the like; the storage part 308, including a hard disc and the like; and a communication part 309, including a network interface card such as an LAN card, a modem and the like. The communication part 309 executes communication processing via a network such as the Internet.

According to requirements, a driver 310 is also connected to the input/output interface 305. A detachable medium 311 such as a magnetic disc, an optical disc, a magnetic optical disc, a semiconductor memory and the like is installed on the driver 310 according to requirements, such that computer programs read therefrom are installed in the storage part 308 according to requirements.

In a case where the foregoing series of processing is implemented by software, programs constituting the software are installed from a network such as the Internet or a storage medium such as the detachable medium 311.

Those skilled in the art should understand that, such a storage medium is not limited to the detachable medium 311 in which programs are stored and which are distributed separately from an apparatus to provide the programs to users as shown in FIG. 3. Examples of the detachable medium 311 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be hard discs included in the ROM 302 and the memory part 308, in which programs are stored and which are distributed together with the apparatus containing them to users.

Preferred embodiments of the present disclosure have been described above with reference to the drawings. However, the present disclosure of course is not limited to the foregoing examples. Those skilled in the art can obtain various alterations and modifications within the scope of the appended claims, and it should be understood that these alterations and modifications naturally will fall within the technical scope of the present disclosure.

For example, in the foregoing embodiments, a plurality of functions incorporated in one unit may be implemented by separate apparatuses. Alternatively, in the foregoing embodiments, a plurality of functions implemented by a plurality of units may be implemented by separate apparatuses, respectively. In addition, one of the above functions may be implemented by a plurality of units. Undoubtedly, such configurations are included within the technical scope of the present disclosure.

In the specification, the steps described in the flowcharts not only include processing executed in the order according to a time sequence but also include processing executed in parallel or separately but not necessarily according to a time sequence. In addition, even if in steps in which processing is executed according to a time sequence, the order undoubtedly still can be appropriately changed.

In addition, the technology of the present disclosure may also perform configurations as follows.

Appendix 1. An information processing method, comprising:

inputting a plurality of samples to a classifier respectively, to extract a feature vector representing a feature of each sample; and updating parameters of the classifier by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

Appendix 2. The information processing method according to Annex 1, wherein the classifier includes a convolutional neural network.

Appendix 3. The information processing method according to Annex 1, wherein for the two different classes, a distance between a center vector of one class of the two different classes and a center vector of the other class is computed as the inter-class distance between the two different classes.

Appendix 4. The information processing method according to Annex 1, wherein a distance between a feature vector of each sample and a center vector of a class to which the sample belongs is computed as the intra-class distance of the sample.

Appendix 5. The information processing method according to Annex 3 or 4, wherein the center vector of each class is an average of feature vectors of all samples belonging to the class.

Appendix 6. The information processing method according to Annex 1, wherein a feature vector variance of each class is computed based on feature vectors of all samples in each class, an average of computed minimum feature vector variance and maximum feature vector variance is taken as the first threshold.

Appendix 7. The information processing method according to Annex 1, wherein at the time of iteratively training the classifier, the parameters of the classifier are updated according to the loss function to update feature vectors of the samples, and per predetermined number of iteration, the first threshold and the second threshold are updated.

Appendix 8. The information processing method according to Annex 1, wherein besides the intra-class distance and the inter-class distance, the loss function further includes a softmax loss function.

Appendix 9. An information processing apparatus, comprising:
a feature vector extracting unit configured to input a plurality of samples to a classifier respectively, to extract a feature vector representing a feature of each sample; and
a parameter updating unit configured to, update parameters of the classifier by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than or equal to twice the first threshold.

Appendix 10. The information processing apparatus according to Annex 9, wherein the classifier includes a convolutional neural network.

Appendix 11. The information processing apparatus according to Annex 9, wherein in the parameter updating unit, for the two different classes, a distance between a center vector of one class of the two different classes and a center vector of the other class is computed as the inter-class distance between the two different classes.

Annex 12. The information processing apparatus according to Annex 9, wherein in the parameter updating unit, a distance between a feature vector of each sample and a center vector of a class to which the sample belongs is computed as the intra-class distance of the sample.

Annex 13. The information processing apparatus according to Annex 11 or 12, wherein the center vector of each class is an average of feature vectors of all samples belonging to the class.

Annex 14. The information processing apparatus according to Annex 9, wherein in the parameter updating unit, a feature vector variance of each class is computed based on feature vectors of all samples in each class, an average of computed minimum feature vector variance and maximum feature vector variance is taken as the first threshold.

Annex 15. The information processing apparatus according to Annex 9, wherein at the time of iteratively training the classifier, the parameters of the classifier are updated according to the loss function to update feature vectors of the samples, and per predetermined number of iteration, the first threshold and the second threshold are updated.

Annex 16. The information processing apparatus according to Annex 9, wherein in the parameter updating unit, besides the intra-class distance and the inter-class distance, the loss function further includes a softmax loss function.

Annex 17. A computer-readable recording medium recording thereon instructions that, when executed, cause to:
input a plurality of samples to a classifier respectively, to extract a feature vector representing a feature of each sample; and
update parameters of the classifier by minimizing a loss function for the plurality of samples, wherein the loss function is in positive correlation with an intra-class distance for representing a distance between feature vectors of samples belonging to a same class, and is in negative correlation with an inter-class distance for representing a distance between feature vectors of samples belonging to different classes, wherein the intra-class distance of each sample of the plurality of samples is less than a first threshold, the inter-class distance between two different classes is greater than a second threshold, and the second threshold is greater than twice the first threshold.

What is claimed is:
1. An information processing method, comprising:
inputting a plurality of samples to a classifier respectively, to extract a feature vector representing a feature of each sample; and
updating parameters of the classifier by minimizing a loss function for the plurality of samples, where the loss function is in positive correlation with an intra-class distance for representing a distance between feature vectors of samples, among the plurality of samples, belonging to a same class, and is in negative correlation with an inter-class distance for representing a distance between feature vectors of samples, among the plurality of samples, belonging to different classes,
wherein the intra-class distance of each sample of the plurality of samples is less than a first threshold, the inter-class distance between two different classes is greater than a second threshold, and the second threshold is greater than twice the first threshold,
wherein for two different classes, a distance between a center vector of one class of the two different classes and a center vector of the other class is computed as the inter-class distance between the two different classes, and
wherein a feature vector variance of each class is computed based on feature vectors of all samples in each class, and an average of computed minimum feature vector variance and maximum feature vector variance is used as the first threshold.

2. The information processing method according to claim 1, wherein the classifier includes a convolutional neural network.

3. The information processing method according to claim 1, wherein a distance between the feature vector of each sample and a center vector of a class to which the sample belongs is computed as the intra-class distance of the sample.

4. The information processing method according to claim 1, wherein the center vector of each class is an average of feature vectors of all samples belonging to the class.

5. The information processing method according to claim 3, wherein the center vector of each class is an average of feature vectors of all samples belonging to the class.

6. The information processing method according to claim 1, wherein at the time of iteratively training the classifier, the parameters of the classifier are updated according to the loss function to update feature vectors of the samples, and per predetermined number of iterations, the first threshold and the second threshold are updated.

7. The information processing method according to claim 1, wherein in addition the intra-class distance and the inter-class distance, the loss function further includes a softmax loss function.

8. An information processing apparatus, comprising:
a memory; and
a processor coupled to the memory,
where the processor is configured to
input a plurality of samples to a classifier respectively, to extract a feature vector representing a feature of each sample; and
update parameters of the classifier by minimizing a loss function for the plurality of samples, where the loss function is in positive correlation with an intra-class distance for representing a distance between feature vectors of sample, from among the plurality of samples, belonging to a same class, and is in negative correlation with an inter-class distance for representing a distance between feature vectors of samples, among the plurality of samples, belonging to different classes,
wherein the intra-class distance of each sample of the plurality of samples is less than a first threshold, the inter-class distance between two different classes is greater than a second threshold, and the second threshold is greater than twice the first threshold,
wherein the processor is configured to compute, for two different classes, a distance between a center vector of one class of the two different classes and the center vector of the other class as the inter-class distance between the two different classes, and
wherein the processor is configured to compute a feature vector variance of each class based on feature vectors of all samples in each class, and use an average of computed minimum feature vector variance and maximum feature vector variance as the first threshold.

9. The information processing apparatus according to claim 8, wherein the classifier includes a convolutional neural network.

10. The information processing apparatus according to claim 8, wherein the processor is configured to compute a distance between the feature vector of each sample and a center vector of a class to which the sample belongs as the intra-class distance of the sample.

11. The information processing apparatus according to claim 9, wherein the center vector of each class is an average of feature vectors of all samples belonging to the class.

12. The information processing apparatus according to claim 10, wherein the center vector of each class is an average of feature vectors of all samples belonging to the class.

13. The information processing apparatus according to claim 8, wherein at the time of iteratively training the classifier, the parameters of the classifier are updated according to the loss function to update feature vectors of the samples, and per predetermined number of iteration, the first threshold and the second threshold are updated.

14. The information processing apparatus according to claim 8, wherein besides the intra-class distance and the inter-class distance, the loss function further includes a softmax loss function.

15. A non-transitory computer-readable recording medium recording thereon instructions that, when executed, cause a computer to:
input a plurality of samples to a classifier respectively, to extract a feature vector representing a feature of each sample; and
update parameters of the classifier by minimizing a loss function for the plurality of samples, where the loss function is in positive correlation with an intra-class distance for representing a distance between feature vectors of sample, among the plurality of samples, belonging to a same class, and is in negative correlation with an inter-class distance for representing a distance between the feature vectors of sample, among the plurality of samples, belonging to different classes,
wherein the intra-class distance of each sample of the plurality of samples is less than a first threshold, the inter-class distance between two different classes is greater than a second threshold, and the second threshold is greater than twice the first threshold,
wherein for two different classes, a distance between a center vector of one class of the two different classes and a center vector of the other class is computed as the inter-class distance between the two different classes, and
wherein a feature vector variance of each class is computed based on feature vectors of all samples in each class, and an average of computed minimum feature vector variance and maximum feature vector variance is used as the first threshold.

* * * * *